(12) United States Patent
Corvasce

(10) Patent No.: US 6,580,773 B1
(45) Date of Patent: Jun. 17, 2003

(54) METHOD AND DEVICE FOR ALIGNING SYNCHRONOUS DIGITAL SIGNALS

(75) Inventor: Giorgio Corvasce, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/397,671

(22) Filed: Sep. 16, 1999

Related U.S. Application Data

(63) Continuation of application No. PCT/IT97/00067, filed on Mar. 25, 1997.

(51) Int. Cl.⁷ .................................................. H04L 7/00
(52) U.S. Cl. ........................................ 375/355; 375/371
(58) Field of Search ................................ 375/371, 372, 375/354, 355, 357, 346

(56) References Cited

U.S. PATENT DOCUMENTS 5,313,496 A * 5/1994 de Goede ................... 375/342
6,178,212 B1 * 1/2001 Akashi ....................... 375/355
6,292,521 B1 * 9/2001 Lai et al. .................... 327/161

FOREIGN PATENT DOCUMENTS

EP        0 392 653 A2    10/1990
EP        0 453 063 A2    10/1991

* cited by examiner

*Primary Examiner*—Stephen Chin
*Assistant Examiner*—David B. Lugo
(74) *Attorney, Agent, or Firm*—Nixon & Vanderhye, P.C.

(57) ABSTRACT

The phase of digital signals is aligned to simplify their acquisition in synchronous systems, by means of a process comprising the following steps: to apply a pulse-width distortion to the incoming signal; to sample in a uniform way such a distorted signal with a frequency which is twice than the clock frequency; to process the obtained samples, in order to re-build the bits which were present on the incoming signal; and to introduce the so obtained bits in a buffer memory, in order to re-build the original signal, now phase-aligned. The process can be carried out by means of a device with electronic circuitry that comprises: a pulse width distortion unit (DS), a unit (CF), that analyzes and samples the distorted samples, a unit (MS) which analyzes the sequences, and a phase-shift register (BF).

10 Claims, 4 Drawing Sheets

METHOD AND DEVICE FOR ALIGNING SYNCHRONOUS DIGITAL SIGNALS

This is a continuation of PCT application PCT/IT97/00067, filed 25 Mar. 1997, the entire content of which is hereby incorporated by reference in this application.

BACKGROUND OF THE INVENTION

The present invention is in the technical field of the communications among digital syncronous systems and is intended to simplify the acquisition of high-rate digital signals, which are exchanged between two systems working with the same clock generator or using two different clock sources which are phase locked.

It is well-known that the phase of the digital signal on receiver side cannot be foreseen, either when the period of the clock which generates the signal is less than the delay between transmitter and receiver (delay in the transmission line+buffer delay) or comparable thereto, or when such delay can be vary due to thermal changes or voltage changes in the energy source. Therefore, to sample the signal without adjusting its phase with respect to the clock is not possible.

An object of this invention is to solve this problem, by extracting data from a synchronous digital signal, which is received with an unknown and unstable phase relationship with the local clock.

In order to make easier to understand the invention, the transmission of a digital signal from a system A to a system B is considered, with reference to FIG. 1 of annexed drawings. Said systems are electronic systems, such as a couple of assembled printed boards, a couple of integrated circuits placed on the same card or a couple of units interconnected by electric cables or optic fibres, either working with the same clock generator, or with two different clock generators which are phase-locked.

The main parameters affecting the phase of the received signal S are:
a) signal delay from A to B, due to the presence of buffers BU and BI, electric lines or electro-optical transducers;
b) delay differences in the distribution of the clock signal towards A and B;
c) possible systematic phase shifts, when employing two discrete phase-locked oscillators;
d) gap between minimum and maximum delays which are introduced by possible line buffers and in general by logic gates existing on the signal path and on the path of the clock signals; and
e) fluctuations of the above referenced parameters, depending on temperature, supply voltage and ageing.

When the period of the clock signal is comparable or less than the summation of the above reported parameters a) to e), it is impossible, from a practical point of view, to foresee with which phase the system B receives the signal in respect to its clock. Accordingly, it is not possible to acquire such a signal by regularly sampling in correspondence of an edge of the clock CB, with no risk of transgressing the setup and hold boundaries required by the sampler (usually a flip-flop) with related risks of metastability and loss of information.

To solve such a problem, a lot of methods to receive and to sample digital, high rate signals in syncronous systems are well-known. The following methods may be referred to:
—synchronising a local oscillator with the received signal, by using a phase-locked loop and using this clock to sample such a signal; exchangeing both data and clock from system A to system B, the paths being controlled; multisampling signal S at a rate higher than the double clock frequency and processing the samples; and employing delay lines having changeable length to adjust the phase of the received signal, before its sampling.

However, the above methods are often difficult to be employed and/or to be carried out, due either to the presence of analog functions (first reported method) or to difficulties in design and construction (other methods)

SUMMARY OF THE INVENTION

This invention solves easier and safer the above problem by re-aligning the received, digital signal to the clock of the receiving system and also compensating possible time depending fluctuations of the phase of said received signal: this makes it possible to sample in an absolutely safe manner, with apparent advantage with respect to the prior-art.

More precisely, the invention relates to a process to align the phase of digital signals, in order to simplify the acquisition thereof in syncronous systems, characterised in that it comprises the following steps:
to apply a pulse width distorsion to the incoming signal;
to sample in a uniform way such a distorted signal with a frequency which is twice than the clock frequency;
to process the obtained samples, in order to re-build the bits which were present on the incoming signal; and
to introduce the so obtained bits in a buffer memory, in order to re-build the original signal, now phase-aligned.

The invention refers also to a device with electronic circuitry to carry out the above process, characterised in that it comprises: a pulse width distorsion unit, a unit that analyses and samples the distorted samples, a unit which analyses the sequences and a phase-shift register.

BRIEF DESCRIPTION OF THE DRAWINGS

Other features of this invention will be apparent from the following, detailed description, referring to the annexed drawings, which show an embodiment thereof.

DESCRIPTION OF THE PREFERRED EMBODIMENT

Pulse width distorsion is assumed below as the half-difference between the duration of a "0" bit and the duration of a "1" bit. Furthermore, in the following the distorsion of the signal is reported as a measure related to the period of the clock signal rather than as an absolute measure. This allows to make the description independent of the actual operating frequency, whereby the highest operating frequency of this invention depends only on the method employed to carry out the same. Finally, a distorsion is below assumed as positive when causes a "0" bit longer than a "1" bit.

Figure 1:
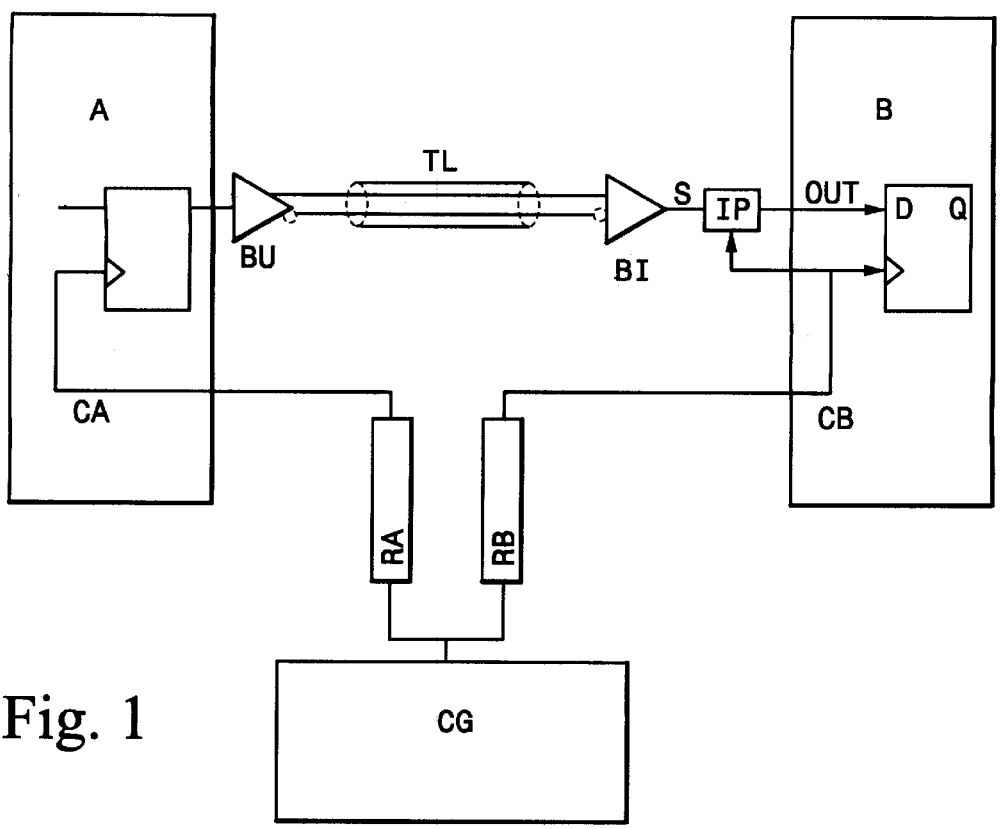
FIG. 1 shows a typical connection between two syncronous, electronic systems, working with the same clock generator, with a device that carries out the process according to the invention.
Figure 2:
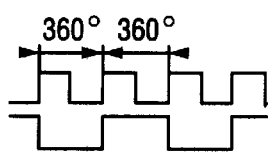
FIG. 2 shows three different exemplary signals distorted by 0°, 180° and 90°, respectively.
Figure 2:
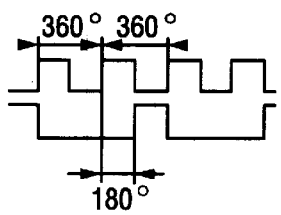
Figure 2:
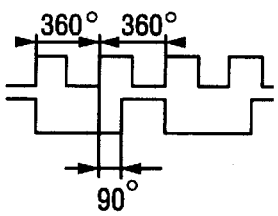

Referring now to FIG. 1 of the annexed drawings, the device IP that carries out the process according to the invention is located between the syncronous systems A and B. Both systems A and B work with the same clock generator CG. In spite of what is shown in FIG. 1, some circuit blocks of the device IP could be included in A and others in B. It is further assumed that the clock signal's of A and B, CA and CB, have a 50% duty cycle, namely they are perfectly symmetrical, and that the digital signal S, received by system B, is free of distorsion.

Figure 3:
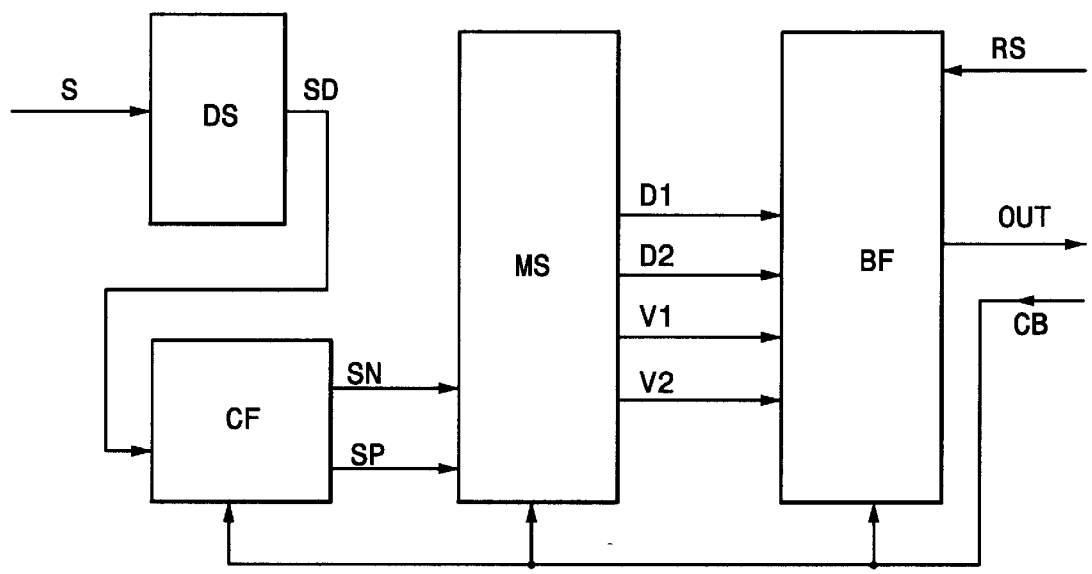
FIG. 3 is the block diagram of the device of FIG. 1.

The block diagram of FIG. 3 shows the device IP according to the invention comprising a pulse width distorsion unit DS, a unit CF, that analyses and samples the distorted samples, a unit MS, which analyses the sequences, and a phase-shift register BF.

Figure 4:
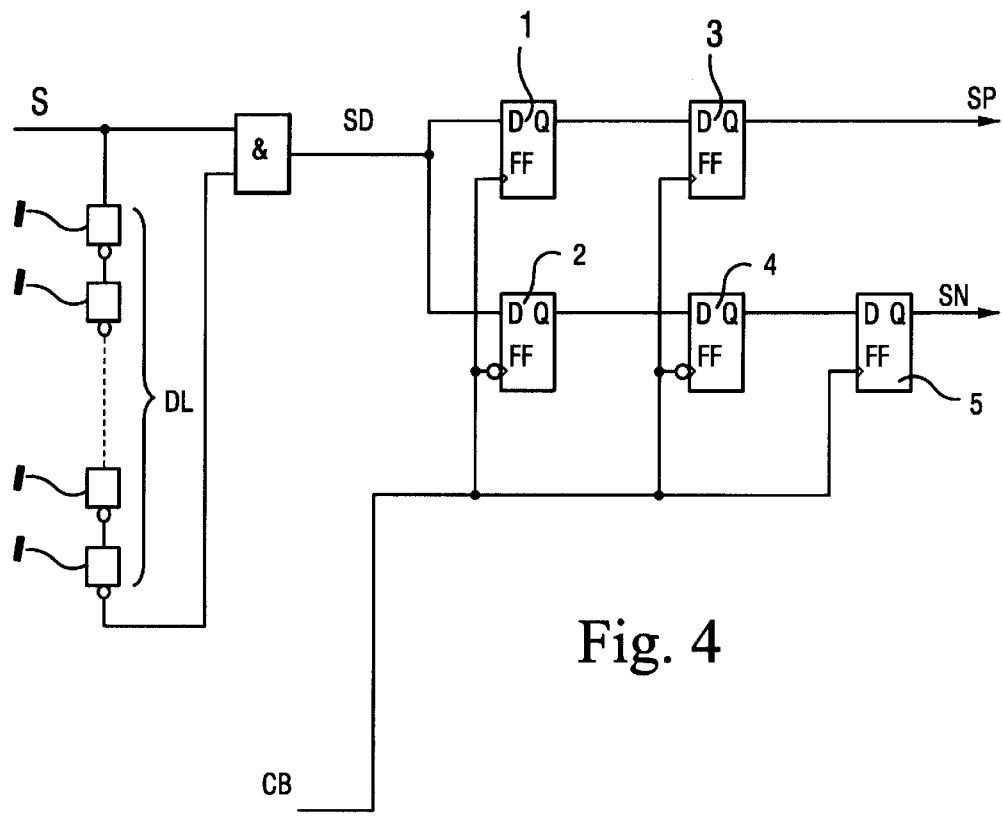
FIGS. 4 to 6 show in detail the circuits of the blocks of FIG. 3.

According to the invention, the signal S is intentionally distorted in the distorsion unit DS of the device IP in the first step of the process. This can be accomplished, as shown in FIG. 4 (representing both DS and CF units) by taking advantage of delay DL, introduced by a number 2×N of inverters I and making the logical product of the original signal by the delayed one. According to the invention, the optimum distorsion equals a quarter clock period, hence 90°. However, this is not a critical value, since it can theoretically range from 0° to 180°, except 0° and 180°. Anyway, a 90° distorsion is equidistant from both operating boundaries.

In the second step of the process according to the invention, the distorted signal SD is sampled both on the positive and negative edge of the clock CB by flip-flops 1 and 2 of the CF unit (FIG. 4). Since the phase of signal S, hence of signal SD, is undefined, a risk arises to sample near to changes of SD. Therefore, a filter against the metastability is inserted in the circuit. This filter consists in further flip-flops 3, 4. The number of filtering stages can also increase depending on the kind of employed technology and on the working frequency.

The sample on the negative edge is now aligned to the one on the positive edge by means of a further flip-flop 5. On every cycle of the clock CB two signals leave the stage CF: the sample SN on the negative edge and the sample SP on the positive edge. Anyway, it must be taken into account that any sample may take on a random value, if the edges of SD and of the clock CB are placed the one with respect to the other so that the setup and hold boundaries of the sampling flip-flops 1 and 2 have not been respected.

Figure 5:
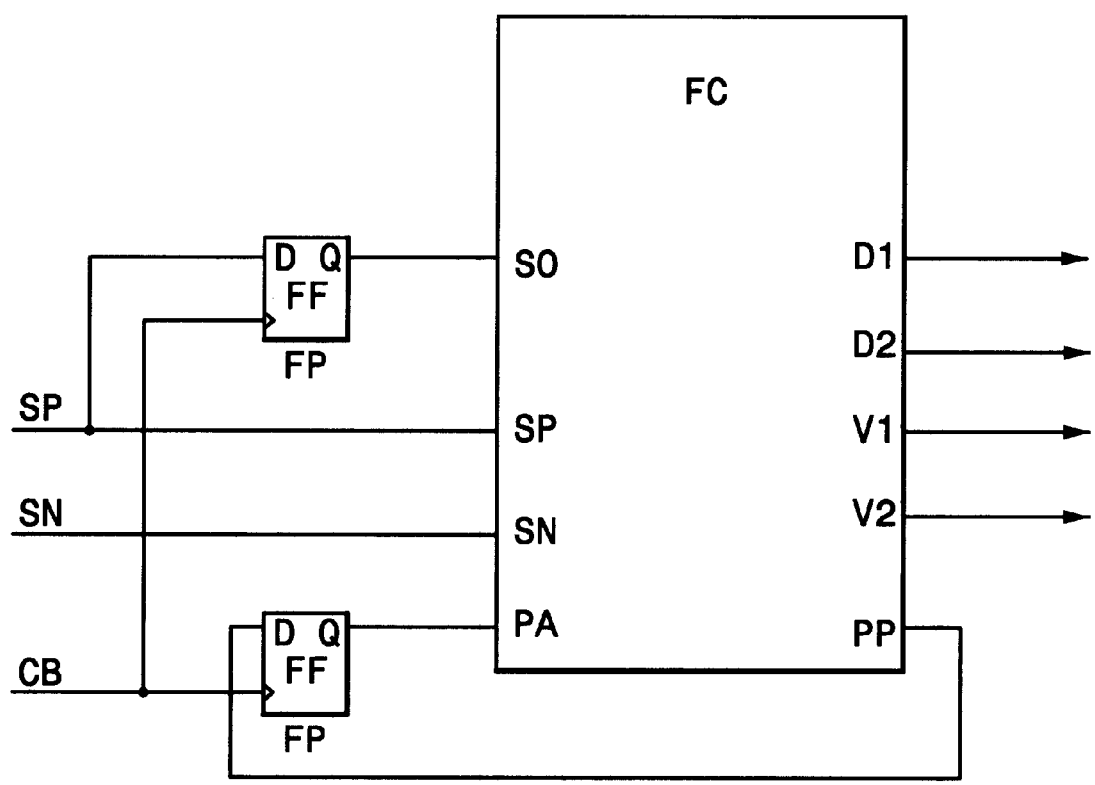

In the third step of the inventive process, two samples enter the finite-status machine shown in FIG. 5 (unit MS) during each cycle of the clock CB; this machine, in turn, gives rise to four outputs: D1, D2, being data outputs, and V1, V2 for signalling whether respective data on the preceding outputs D1 and D2 are significant. From a practical point of view, it is possible that during each cycle of clock CB:

no significant data is provided (V1=V2=0);
only one significant datum is provided (V1=1, V2=0 with datum D1);
two significant data is provided by (V1=V2=1 with data D1 ,D2).

Said data, with relevant control signals, is sent to a buffer memory (FIFO memory, FIG. 6), from which only one bit per clock cycle is extracted, beginning the fourth step of the inventive process. Depending on the signals V1 and V2, none or one or two data can enter said buffer memory. As clearly explained below, this output is identical, according to the invention, to the signal S and is perfectly phase aligned to the clock CB.

For a better understanding, the finite-status machine ms in FIG. 5 is to be further considered. This is a Mealy's machine, carrying only two memory elements FO and FP, the function of each being well-defined. The first memory element FO is intended to store the sample SP of the previous cycle, referred to as SO, while the second memory element FP is intended to store the variable PA, which reports whether the number of consecutive "0" or "1" samples, evaluated in more cycles, is even or odd. The four outputs D1, D2, V1, V2 and the next PA value, namely PP, are combinatorial functions of the four inputs SP, SN, SO and PA.

The reason why it is important to analyse the sequence of samples for evaluating if the number of consecutive "0" or "1" is even or odd, is related with the distorsion applied to the signal and corresponds to the observation on which the present invention is based. In fact, note that a "0" bit in the signal SD has a duration of 360°+90°; since there is one sampling per 180° at least two and at most three samples can be found in such a period, depending on the phase of the bit relative to the clock. Two consecutive "0" bits have a duration of (2×360°)+90° and contain at least four and at most five samples. Furthermore, if a sample is found on the signal SD edge, hence it has an unforeseeable value because of its metastability, the same is not true for the other samples relative to the same bit(s), since the subsequent SD edge is not in a position multiple of 180° with respect to the previous one. Accordingly, if n consecutive zeroes ("0") are found by analysing a sample sequence, if n is even the signal S contained n/2 zeroes, while if n is odd the signal S contained (n−1)/2 zeroes The contrary is true for the "1" bits: in a sample sequence of n consecutive ones ("1") the signal S contained n/2 ones if n is even whilst it contained (n+1)/2 ones if n is odd. In any case, the value and the duration of each bit of the signal S can be evaluated from the samples of the distorted signal.

The finite-status machine MS in FIG. 5 works as follows:
a) If SN=1 and SP=0, a one sequence ends and a zero sequence begins. PP is a (false) "0", because the new, just begun zero sequence has only one zero, thus it has an odd length. If SO is "0" or SO is "1" while PA is "1", so the ending one sequence has odd length and another one is to be generated in the output: therefore D1=1, V1=1, V2=0. D2 value is not important, since it is discarded when V2=0. If none of such situations takes place, V1 and V2 are both set to "0".
b) If SP=SN=0, FIFO memory should be provided with a "0" bit, thus: D1=0, V1=1, V2=0. Furthermore, PP will equal PA if SO equals "0", otherwise PA will be "1", since a new zero sequence has begun, the length of which is two, thus even.
c) If SP=SN=1, FIFO memory should be provided with one "1" bit, hence D1=1, V1=1, V2=0. Furthermore, PP will equal PA if SO is "1", otherwise PA will be a "1", since a new one sequence has begun, the length of which is two, hence even.
d) If SN=0 and SP=1, a zero sequence ends and another one sequence begins. PP will be a (false) "0", because the new sequence has only one "1", hence it has an odd length. If PA is "0", the ending zero sequence has an even length and another "0" should be generated in the output. Furthermore, the new "1", identified by SP, should be taken into account, hence: D1=0, D2 =1, V1=1, V2=1. On the contrary, if PA is "1", the ending sequence has an odd length and no new "0" bit is to be generated. Only one new "1" is to be handled, hence: D1=1, V1=1, V2=0. SO will always be "0" because of the minimum length (360°+90°) of a "0" bit. The contrary would be an error condition and it would not matter which are the outputs.

Figure 6:
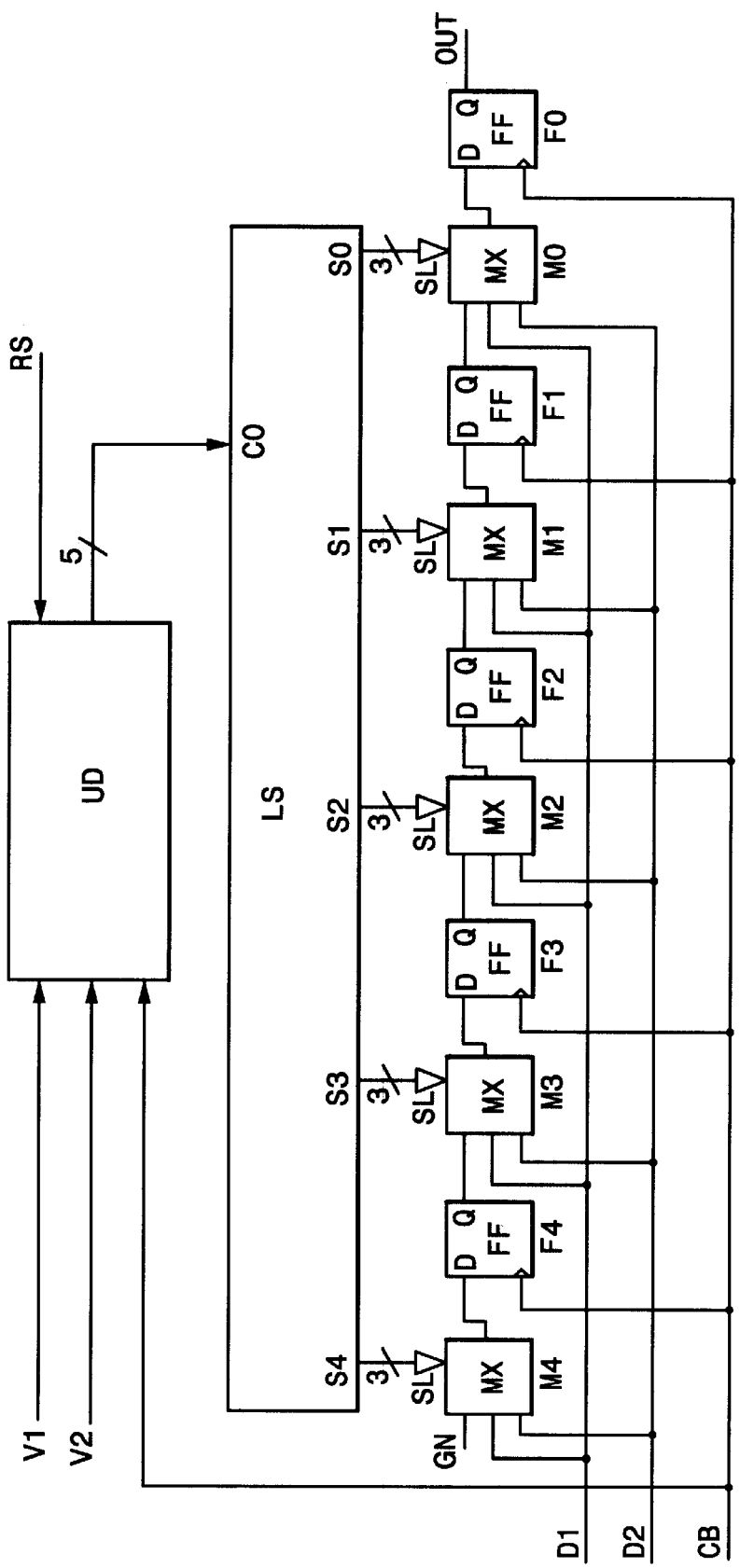

As for what concerns the buffer memory, that embodies the last unit of the device according to the invention (phase shift register BF), it is a FIFO (First In First Out) memory, a possible embodiment of which is shown in FIG. 6 of the annexed drawings. It is a special phase shift register, comprising five flip-flops FC to F4 (but the number of flip-flops is not critical). Every flip-flop carries on its own data input a selector (multiplexer) MX with three inputs, which are respectively connected: —to the output of the previous flip-flop; —to datum D1; —to datum D2. The first input of the selector M4 of the flip-flop F4 is grounded at GN. The selection signals for the selectors come from a decode logic LS, the input of which is provided by an up and down counter UD. Said counter has five outputs, due to the linear status code and goes up when the valid data are two (V1=V2=1), is stationary in the presence of only one valid datum (V1=1; V2=0) and goes down when in absence of valid data (V1=V2=0). Furthermore, an initialisation signal RS is provided, in order to set the counter to an intermediate value. The logic controlling the multiplexer selection arranges the flip-flop corresponding to the counter value to load datum D1, the previous (in the chain of FIG. 6 from left to right) flip-flop to load datum D2 and all subsequent flip-flops (up to FO) to work as a conventional phase-shift register. So, a datum exits flip-flop FO on each clock pulse, such data being an output (OUT, FIGS. 1 and 6) of the device according to the invention. Such an output is identical to signal S and is perfectly phase aligned to the clock CB. Thus the object of the invention is achieved. Simultaneously, possible valid data coming from the finite-status machine MS, which analyses the samples, are appended to said phase-shift register BF.

It is to be noted that the present invention solves very easily—within the scope of the communications in digital synchronous systems—the problem of sampling a digital signal, independently of the phase with which is received. The process and the device according to this invention are very simple, compared to well-known analogic systems, and they have no critical point and/or aspect. In this respect, note that the operative boundaries of the invention are comparatively wide: for instance, when working with a 50 MHz frequency (period 20 ns), a 90° distorsion corresponds to 5 ns. Since, as pointed out, the theoretical operative boundaries range between 0° and 180°, effective application of the invention is ensured when tolerances on distorsion, duty cycle of the clock and sampling jitter due to the noise result in a whole effect not higher than ±5 ns. The process and the device of the invention are particularly useful in high-rate systems.

What is claim is:

1. A process to align the phase of digital signals, in order to simplify the acquisition thereof in synchronous systems, the process comprising the following steps:

applying a pulse width distortion to an incoming signal;

sampling the distorted signal in a uniform way with a frequency which is twice the clock frequency;

processing the obtained samples in order to re-build bits which were present on the incoming signal; and introducing the rebuilt bits in a buffer memory in order to re-build the original signal, now phase-aligned.

2. A process as claimed in claim 1, wherein the introduced distortion can range from 0° to 180°, except 0° and 180°.

3. A process as claimed in claim 2, wherein the introduced distortion is 90°.

4. A process as claimed in claim 1, wherein the distorted signal is sampled both on a positive and a negative edge of the clock.

5. A device with electronic circuitry to carry out a process as claimed in claim 1, comprising:

a pulse width distortion unit, a unit that analyzes and samples the distorted samples, a unit which analyzes the sequences, and a phase-shift register.

6. A device as claimed in claim 5, wherein said unit that analyzes is a finite-status machine.

7. A device as claimed in claim 6, wherein said machine is a Mealy's machine with only two memory elements.

8. A device as claimed in claim 5, wherein said phase-shift register is a buffer memory.

9. A device as claimed in claim 8, wherein said buffer memory is a FIFO memory.

10. A device as claimed in claim 9, wherein said FIFO memory includes five flip-flops.

* * * * *